(12) United States Patent
Sato (10) Patent No.: US 8,930,567 B2
(45) Date of Patent: Jan. 6, 2015

(54) COMMUNICATION APPARATUS, COMMUNICATION METHOD, AND STORAGE MEDIUM THEREFOR

(75) Inventor: Haruki Sato, Tokyo (JP)

(73) Assignee: Canon Kabushiki Kaisha (JP)

( * ) Notice: Subject to any disclaimer, the term of this patent is extended or adjusted under 35 U.S.C. 154(b) by 266 days.

(21) Appl. No.: 13/209,540

(22) Filed: Aug. 15, 2011

(65) Prior Publication Data

US 2012/0054354 A1 Mar. 1, 2012

(30) Foreign Application Priority Data

Aug. 26, 2010 (JP) ................. 2010-189759

(51) Int. Cl.
  *G06F 15/16* (2006.01)
  *H04L 29/06* (2006.01)
  *H04N 1/00* (2006.01)

(52) U.S. Cl.
  CPC ........ *H04L 65/1069* (2013.01); *H04N 1/00217* (2013.01); *H04L 65/1006* (2013.01); *H04L 65/80* (2013.01); *H04N 2201/0015* (2013.01); *H04N 2201/0081* (2013.01); *H04N 2201/0082* (2013.01)

USPC .......................................... 709/232; 709/228

(58) Field of Classification Search
  USPC ....................................................... 709/232
  See application file for complete search history.

(56) References Cited

U.S. PATENT DOCUMENTS

| | | | |
|---|---|---|---|
| 7,983,218 B2 * | 7/2011 | Kesavan et al. | 370/331 |
| 2008/0133644 A1 * | 6/2008 | Garcia-Martin et al. | 709/202 |
| 2011/0078283 A1 * | 3/2011 | Gokurakuji et al. | 709/219 |

FOREIGN PATENT DOCUMENTS

JP 2010-109738 A 5/2010

* cited by examiner

*Primary Examiner* — Shaq Taha
(74) *Attorney, Agent, or Firm* — Rossi, Kimms & McDowell LLP (57) ABSTRACT

A communication apparatus capable of establishing a SIP session from which an unnecessary media session has been removed. When determining that a SIP session established with another communication apparatus includes an unnecessary media session other than a media session necessary for communication therewith, the communication apparatus establishes a SIP session not including the unnecessary media session with the other communication apparatus.

12 Claims, 9 Drawing Sheets

COMMUNICATION APPARATUS, COMMUNICATION METHOD, AND STORAGE MEDIUM THEREFOR

BACKGROUND OF THE INVENTION

1. Field of the Invention

The present invention relates to a communication apparatus, a communication method, and a storage medium therefor, and more particularly, to a SIP communication apparatus, a SIP communication method, and a storage medium therefor.

2. Description of the Related Art

To conduct SIP (session initiation protocol) communication, SIP negotiation is performed between a communication apparatus and a communication counterpart to exchange SDPs (session description protocols) each describing media information that indicates one or more media types. Subsequently, a SIP session for data transmission and reception is established that includes one or more media sessions, which can be transmitted and received by both the communication apparatus and the communication counterpart.

Since IP exchange network fees are charged based on bandwidth usage or the number of media sessions, it is advantageous from the viewpoint of user cost that the communication apparatus capable of handling plural types of media establishes with the communication counterpart a SIP session not including a media session unnecessary for communication, but including only an optimum media session.

To establish a SIP session only including the optimum media session even when the media capability of the communication counterpart is unknown, some conventional communication apparatus capable of handling plural types of media performs the following operations.

First, the communication apparatus transmits to the communication counterpart a SIP session establish request (INVITE message) that includes an offer SDP describing plural pieces of media information. When an error response is sent back from the communication counterpart, the communication apparatus checks an answer SDP included in the error response and transmits to the communication counterpart an INVITE message that includes a SDP describing optimum media information. On the other hand, when a success response is sent back from the communication counterpart, the communication apparatus establishes a SIP session with the communication counterpart by using optimum media described in an answer SDP included in the success response (see, for example, Japanese Laid-open Patent Publication No. 2010-109738).

With the method disclosed in Japanese Laid-open Patent Publication No. 2010-109738, the communication apparatus transmits to the communication counterpart an offer SDP that proposes plural types of media for being used to establish a SIP session with the communication counterpart with reliability, and waits for one media being selected by the counterpart apparatus from among plural media described in the offer SDP. However, depending on the communication counterpart, a response sent back from the communication counterpart sometimes includes an answer SDP describing all the media that can be handled by the communication counterpart among the plural media described in the offer SDP. Even in such a case, the communication apparatus is required to handle all the media described in the answer SDP, as optimum media. As a result, a SIP session including an unnecessary media session is established, so that undesired IP exchange network fees will be charged. In addition, the communication apparatus wastefully consumes its resources such as a port, socket, and memory for the unnecessary media session.

SUMMARY OF THE INVENTION

The present invention provides a communication apparatus, a communication method, and a storage medium therefor, which are capable of establishing a SIP session from which a media session unnecessary for communication has been removed.

According to one aspect of the present invention, there is provided a communication apparatus, which comprises a first session establishment unit configured to establish a SIP session with another communication apparatus, a determination unit configured to determine whether the SIP session established by the first session establishment unit includes an unnecessary media session other than a media session necessary for communication with the other communication apparatus, and a second session establishment unit configured, in a case where it is determined by the determination unit that the SIP session established by the first session establishment unit includes the unnecessary media session, to establish with the other communication apparatus a SIP session not including the unnecessary media session.

With this invention, if a SIP session includes an unnecessary media session other than a media session necessary for SIP communication with another communication apparatus, the communication apparatus is capable of establishing with the other communication apparatus another SIP session not including the unnecessary media session.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

Figure 1:
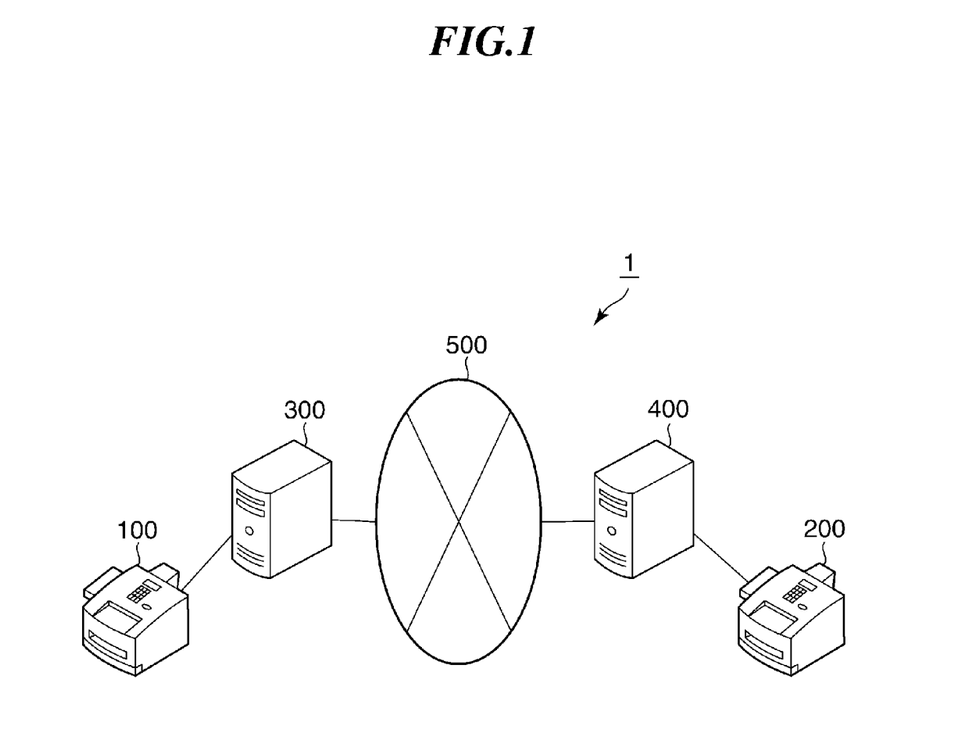
FIG. 1 is a view showing the construction of a communication system including communication apparatuses according to embodiments of this invention.

FIG. 1 shows the construction of a communication system that includes communication apparatuses according to embodiments of this invention.

In FIG. 1, there is shown a communication system 1 that includes communication apparatuses 100, 200, gateway apparatuses 300, 400, and an IP exchange network 500.

The communication apparatuses 100, 200 are connected to the exchange network 500 through the gateway apparatuses 300 and 400, respectively, and establish a SIP session by exchanging SIP (session initiation protocol) messages with each other through the network 500.

Using a SIP protocol, the exchange network 500 controls media data communication between the communication apparatuses 100, 200. The exchange network 500 charges fees based on media information and bandwidth information, which are included in the SIP messages exchanged between the communication apparatuses 100, 200 and which are used in the SIP session.

The communication system 1 shown in FIG. 1 has two communication apparatuses and two gateway apparatuses, but can have any number of communication apparatuses and gateway apparatuses so long as capable of establishing a SIP session.

In the following, a description will be given of the construction of the communication apparatus 100. The communication apparatus 200 has the same construction as that of the communication apparatus 100, and therefore a description thereof will be omitted.

Figure 2:
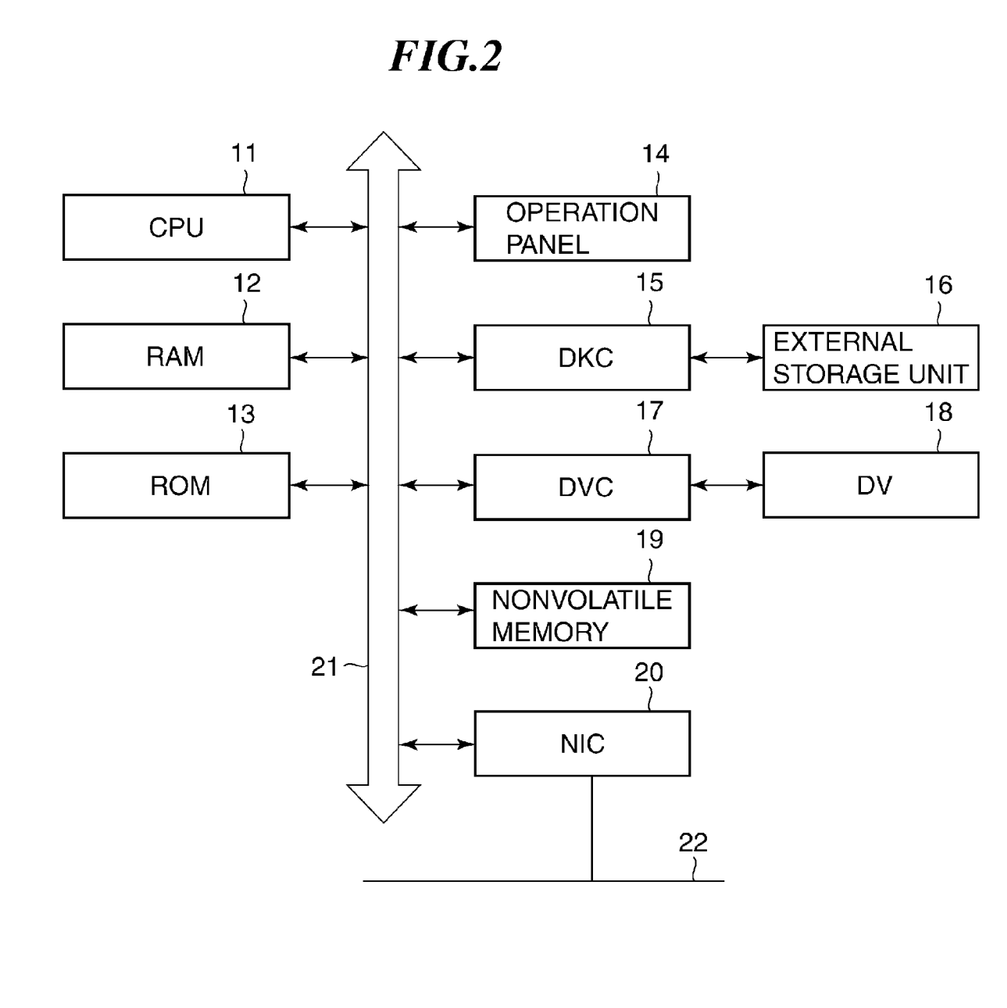
FIG. 2 is a view showing the electrical structure of one of the communication apparatuses.

FIG. 2 shows the electrical structure of the communication apparatus 100.

As shown in FIG. 2, the communication apparatus 100 includes a CPU 11 (central processing unit), RAM 12 (random access memory), ROM 13 (read only memory), operation panel 14, DKC 15 (disk controller), DVC 17 (device controller), nonvolatile memory 19, and NIC 20 (network interface card), which are connected to a system bus 21.

An external storage unit 16 is connected to the DKC 15, and a DV 18 (device) is connected to the DVC 17.

The CPU 11 controls the entire communication apparatus 100 by executing a program stored in the ROM 13. The RAM 12 functions, for example, as a main memory and a work area for the CPU 11. The ROM 13 stores the program, etc. The operation panel 14 is a user interface for use by a user to perform various settings and to start an application for SIP communication. The DKC 15 controls the external storage unit 16 that stores images and user data. The DVC 17 controls the DV 18 (e.g., a printer or a scanner). The nonvolatile memory 19 stores the contents of a SIP session established in a SIP communication and stores setting information set through the operation panel 14. The NIC 20 is an interface with a LAN 22 (local area network) and realizes a SIP communication through the LAN 22. The communication apparatus 100 can be provided with input devices such as a keyboard and a mouse (none of which are shown in FIG. 2).

Figure 3:
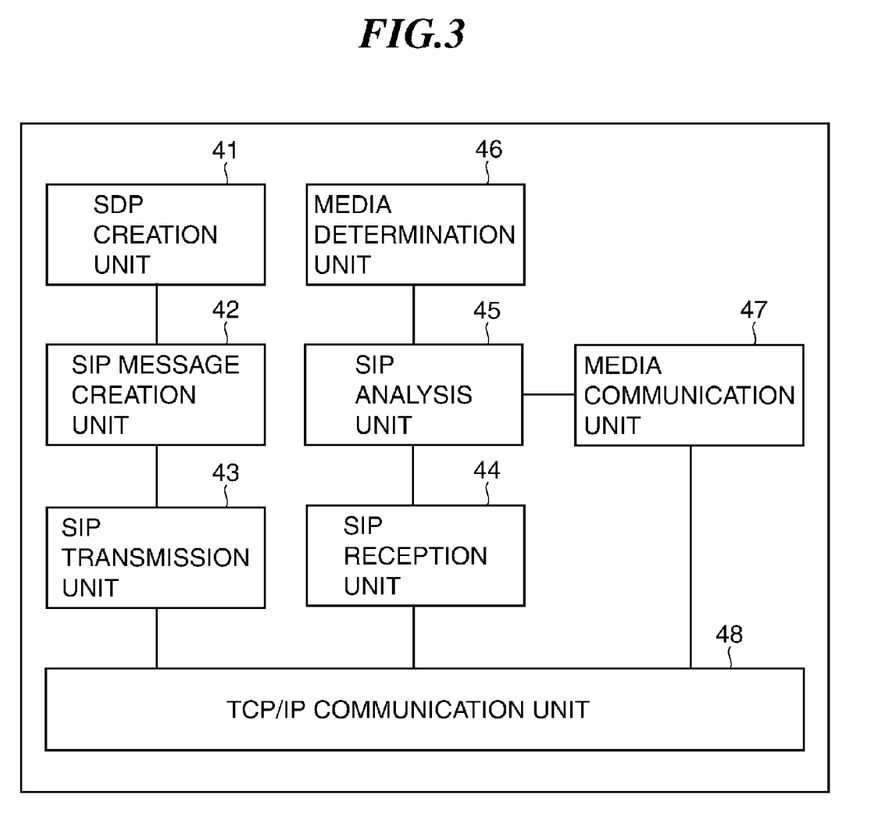
FIG. 3 is a functional block diagram of the communication apparatus.

FIG. 3 shows the communication apparatus 100 in function block.

As shown in FIG. 3, the communication apparatus 100 includes a SDP creation unit 41, SIP message creation unit 42, SIP transmission unit 43, SIP reception unit 44, SIP analysis unit 45, media determination unit 46, media communication unit 47, and TCP/IP communication unit 48.

The SDP creation unit 41 creates a SDP that describes media information used to realize a voice/data communication (such as IP FAX, IP telephone, or moving image communication), and transmits the created SDP to the SIP message creation unit 42. The SIP message creation unit 42 creates and transmits to the SIP transmission unit 43 a SIP response and a SIP message having a message body that reflects the received SDP. The SIP transmission unit 43 transmits, through the TCP/IP communication unit 48 to a communication counterpart (e.g., the communication apparatus 200) on the network, the SIP message and the SIP response received from the SIP message creation unit 42. The SIP reception unit 44 receives a SIP message and a SIP response from the communication apparatus 200 through the TCP/IP communication unit 48, and transmits the received message and response to the SIP analysis unit 45.

From the received SIP message and SIP response, the SIP analysis unit 45 acquires pieces of information such as media type, IP address of transmission destination of media data, and transmission destination port number, which will be used in a SIP session. The SIP analysis unit 45 transmits these pieces of information to the media determination unit 46 and to the media communication unit 47.

Based on information included in the SIP session and representing a use state of a media session, the media determination unit 46 determines whether or not the media session is necessary for SIP communication. The media communication unit 47 performs a voice/data communication (such as IP FAX, IP telephone, or moving image communication) with the IP address and port of transmission destination of media data. The TCP/IP communication unit 48 performs TCP/IP control and management, and performs port control for network communication.

In the following, information exchange between the communication apparatuses 100, 200 in each of three types of session establishment processes, which are each executed in the communication system for establishment of a SIP session only including a necessary media session, and procedures of a session establishment process performed by the communication apparatus 100 or 200 will be described.

First Embodiment

Figure 4:
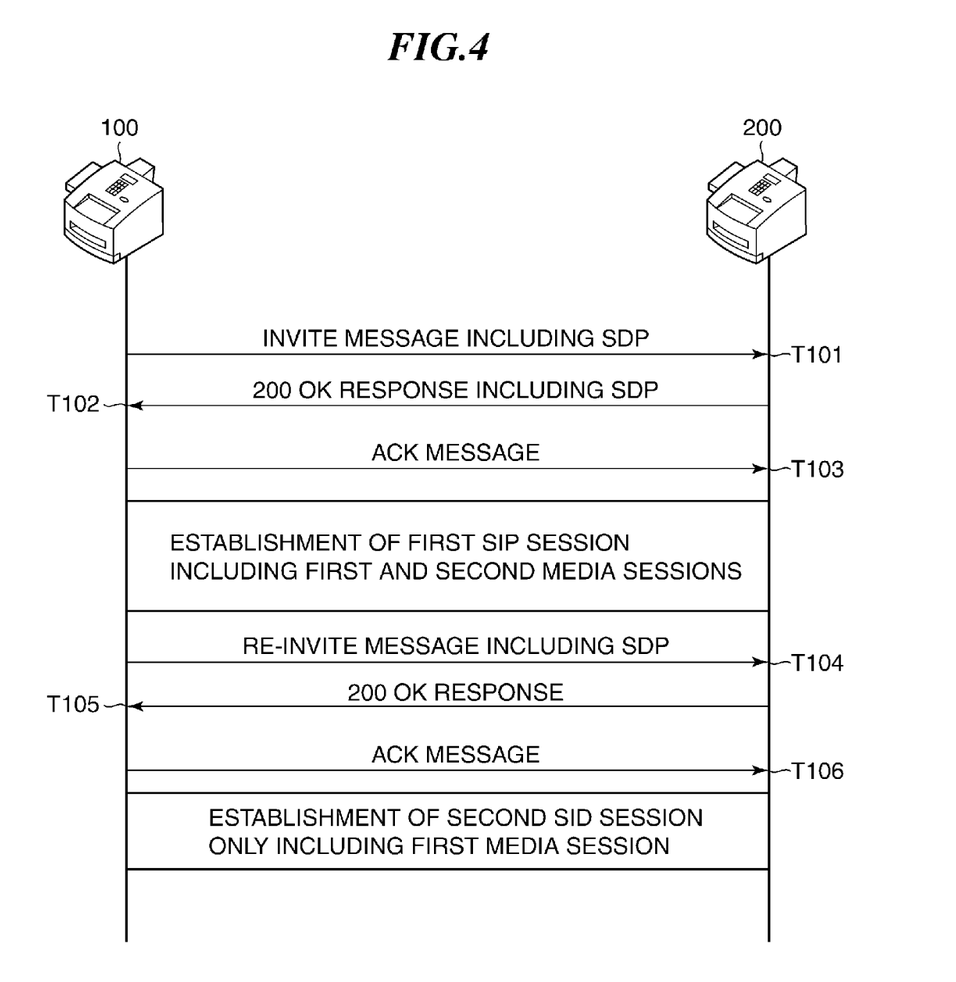
FIG. 4 is a sequence diagram showing information exchange between communication apparatuses in a first embodiment of this invention.

FIG. 4 shows, in sequence diagram, information exchange between the communication apparatuses 100, 200 in a first embodiment of this invention.

The communication apparatus 100 is capable of handling media of an application type and media of an image type and capable of establishing with the communication apparatus 200 a SIP session (including an application media session and an image media session) for data communication.

Similarly, the communication apparatus 200 is capable of handling media of an application type and media of an image type and capable of establishing with the communication apparatus 100 a SIP session (including an application media session and an image media session) for data communication.

In a case where data communication using the SIP session can be achieved by means of the application media session and by means of the image media session, the communication apparatus 100 transmits to the communication apparatus 200 an INVITE message that includes a SDP in which information that specifies application media (hereinafter, referred to as the application media information) is described and in which information that specifies image media (hereinafter, referred to as the image media information) is also described in hope that the communication apparatus 200 will select one of the application media session and the image media session (T101).

Since the communication apparatus 200 is capable of handling the two types of media proposed in the received INVITE message, the communication apparatus 200 does not select either the application media or the image media, but accepts both of them. The communication apparatus 200 then transmits to the communication apparatus 100 a success response (200 OK response) that includes a SDP describing the application media information and the image media information as media information indicating media that can be accepted for the SIP session (T102).

When receiving the success response, the communication apparatus 100 transmits an ACK message to the communication apparatus 200 (T103). As a result, a first SIP session is established that includes the application media session (serving as a first media session) and the image media session (serving as a second media session).

The communication apparatuses 100, 200 start data communication using one or more necessary media sessions among the media sessions included in the established SIP session. At that time, the communication apparatus 100 confirms the open/close status of each of ports for use in the media sessions included in the SIP session. If one or more ports are open, it is determined that a corresponding one or more media sessions are necessary for SIP communication. If one or more ports are closed, it is determined that a corresponding one or more media session are unnecessary for SIP communication. In this example, it is determined that the application media session is necessary and that the image media session is unnecessary. Thus, data communication using the application media session is started.

To update the first SIP session to a second SIP session only including the application media session, the communication apparatus 100 transmits to the communication apparatus 200 a Re-Invite message, as a SIP session update request, that includes a SDP only describing the application media information (T104).

The communication apparatus 200 transmits a success response (200 OK response) to the communication apparatus 100 in reply to the Re-Invite message (T105).

When receiving the success response in reply to the Re-Invite message, the communication apparatus 100 transmits an ACK message to the communication apparatus 200 (T106). As a result, the first SIP session including the application media session and the image media session is updated to the second SIP session only including the application media session.

In this embodiment, the application media session and the image media session are included in the SIP session. However, a media session other than the application media session and/or a media session other than the image media session can be included in the SIP session. In this embodiment, whether each media session is necessary for communication is determined based on the open/close status of a corresponding port for use in the media session. Alternatively, it is possible to determine the necessity/unnecessity of each media session based on a media session notified from and used by an application that transmits and receives media data. Although the Re-Invite message is used as the SIP session update request in this embodiment, an update message can be used instead thereof.

Figure 5:
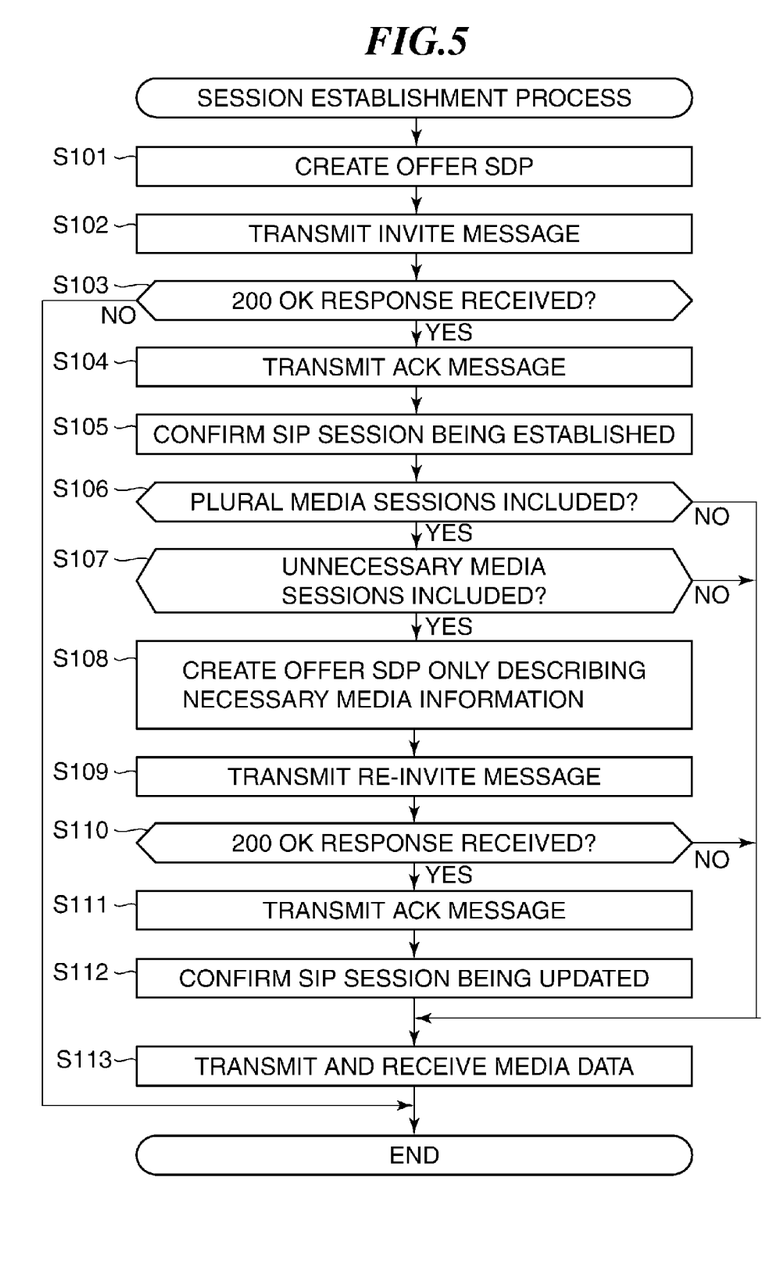
FIG. 5 is a flowchart showing procedures of a session establishment process performed by one of the communication apparatuses in the first embodiment.

FIG. 5 shows in flowchart the procedures of a session establishment process executed by the communication apparatus 100 in the first embodiment.

Referring to FIG. 5, the SDP creation unit 41 creates an offer SDP describing one or more media types that can be handled by the communication apparatus 100 (step S101). The SIP message creation unit 42 creates an INVITE message including the offer SDP, and the SIP transmission unit 43 transmits the INVITE message (step S102). The SIP reception unit 44 waits for a final response from the communication apparatus 200.

The SIP analysis unit 45 determines whether a received final response is a 200 OK response, which is a success response (step S103). If the final response is a 200 OK response (i.e., if the answer to step S103 is YES), the process proceeds to step S104. Otherwise, if the answer to step S103 is NO, the process is completed.

The SIP transmission unit 43 transmits an ACK message in reply to the 200 OK response (step S104), and the communication apparatus 100 confirms that a SIP session is established (step S105).

Next, the SIP analysis unit 45 determines whether the SIP session includes a plurality of media sessions (step S106). If the SIP session includes a plurality of media sessions (i.e., if the answer to step S106 is YES), the process proceeds to step S107. Otherwise, if the answer to step S106 is NO, the process proceeds to step S113.

The media determination unit 46 inquires of the TCP/IP communication unit 48 about open/close statuses of respective ports for use by the media sessions included in the SIP session, and determines whether the SIP session includes one or more media sessions that are unnecessary for actual communication (step S107).

If the SIP session includes one or more unnecessary media sessions (i.e., if the answer to step S107 is YES), the process proceeds to step S108. Otherwise, if the answer to step S107 is NO, the process proceeds to step S113.

The SDP creation unit 41 creates an offer SDP only describing media information of one or more media sessions determined in step S107 as being necessary (step S108). The SIP message creation unit 42 creates a Re-Invite message including the offer SDP created in step S108, and the SIP transmission unit 43 transmits the Re-Invite message (step S109). The SIP reception unit 44 waits for a final response from the communication apparatus 200.

The SIP analysis unit 45 determines whether a received final response is a 200 OK response, which is a success response (step S110). If the final response is a 200 OK response (i.e., if the answer to step S110 is YES), the process proceeds to step S111. Otherwise, if the answer to step S110 is NO, the process proceeds to step S113.

The SIP transmission unit 43 transmits an ACK message in reply to the 200 OK response (step S111). The communication apparatus 100 confirms that the SIP session established in step S105 is updated to a SIP session only including the one or more necessary media sessions (step S112). The media communication unit 47 transmits and receives media data by using one of the one or more media sessions included in the SIP session (step S113), whereupon the process is completed.

Steps S101 to S105 in FIG. 5 correspond to a first session establishment unit that establishes a SIP session with another communication apparatus (communication apparatus 200). Step S107 corresponds to a determination unit that determines whether the SIP session established by the first session establishment unit includes an unnecessary media session, which is other than a media session necessary for communication with the communication apparatus 200. Steps S108 to S112 correspond to a second session establishment unit that establishes with the communication apparatus 200 a SIP session not including an unnecessary media session in a case where it is determined by the determination unit that the SIP session established by the first session establishment unit includes the unnecessary media session. Specifically, in steps S108 to S112, the communication apparatus 100 creates a SDP only including the necessary media session and transmits to the communication apparatus 200 a SIP connection update request based on the SDP, thereby establishing with the communication apparatus 200 a SIP session not including the unnecessary media session.

With the session establishment process of FIG. 5, in a case where it is determined that an initially established SIP session includes an unnecessary media session, the communication apparatus 100 establishes with the communication apparatus 200 another SIP session only including a necessary media session, whereby the SIP session from which the media session unnecessary for actual communication has been removed can be established.

Second Embodiment

Figure 6:
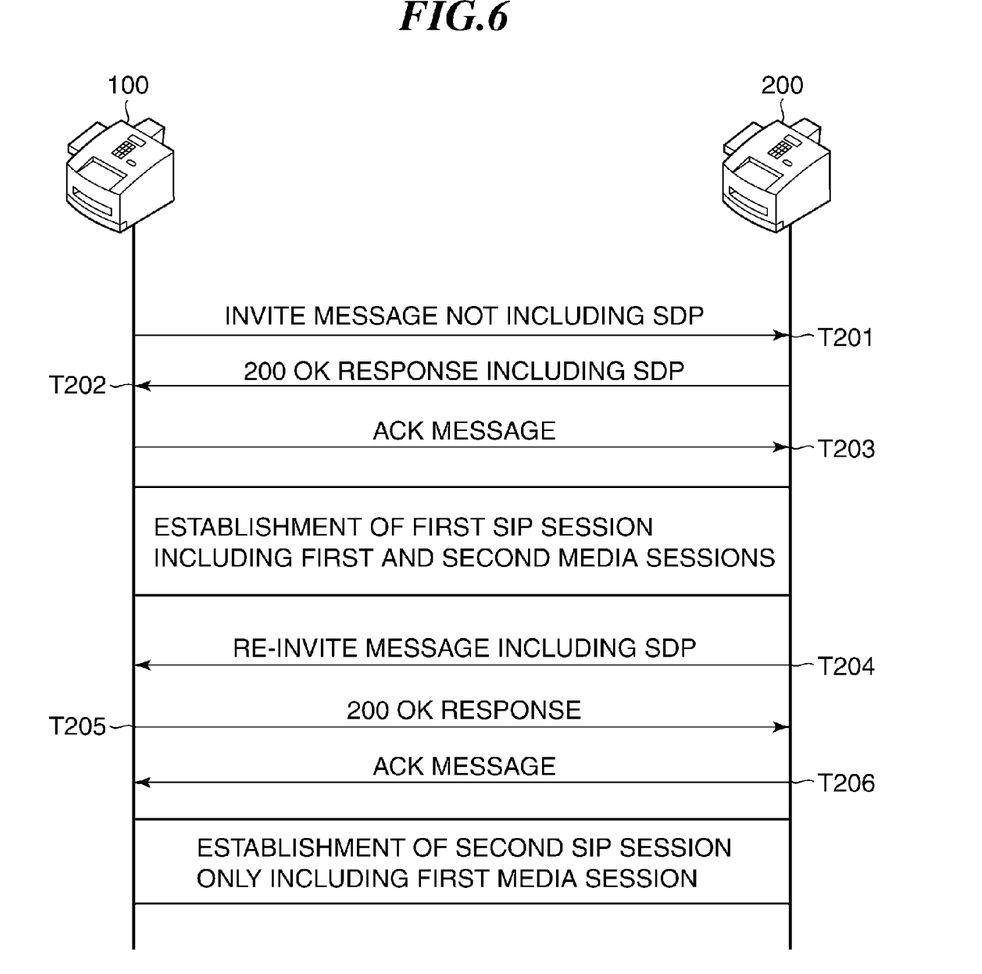
FIG. 6 is a sequence diagram showing information exchange between communication apparatuses in a second embodiment of this invention.

FIG. 6 shows, in sequence diagram, information exchange between the communication apparatuses 100, 200 in a second embodiment of this invention.

As with the communication apparatus 100 shown in FIG. 4, the communication apparatus 100 in FIG. 6 is capable of handling media of an application type and media of an image type and capable of establishing with the communication apparatus 200 a SIP session (including an application media session and an image media session) for data communication.

As with the communication apparatus 200 shown in FIG. 4, the communication apparatus 200 in FIG. 6 is capable of handling media of an application type and media of an image type and capable of establishing with the communication apparatus 100 a SIP session (including an application media session and an image media session) for data communication.

The communication apparatus 100 transmits an INVITE message not including an offer SDP to the communication apparatus 200 (T201). The communication apparatus 200 creates an offer SDP describing media of an application type and media of an image type that can be handled by the communication apparatus 200 since the INVITE message received by the apparatus 200 does not include an offer SDP. Next, the communication apparatus 200 transmits a success response (200 OK response) including the offer SDP in hope that the communication apparatus 100 will select one of the media types described in the offer SDP (T202).

When receiving the success response, the communication apparatus 100 does not select either one of proposed two media types, but accepts both the media types that can be handled by the communication apparatus 100, and transmits an ACK message (T203). As a result, a first SIP session is established that includes the application media session as a first media session and also includes the image media session as a second media session.

The communication apparatuses 100, 200 start data communication by using the application media session among the media sessions included in the established SIP session. At that time, the communication apparatus 100 confirms the open/close status of each of ports for use in the media sessions included in the first SIP session, and determines that if the port is open, the corresponding media session is necessary for SIP communication and that if the port is closed, the corresponding media session is unnecessary for SIP communication. In this example, the image media session is determined as being unnecessary, but the application media session is determined as being necessary.

To update the first SIP session to a second SIP session that only includes the application media session, the communication apparatus 200 transmits to the communication apparatus 100 a Re-Invite message (as a SIP session update request) that includes a SDP only describing the application media information (T204).

The communication apparatus 100 transmits a success response (200 OK response) to the communication apparatus 200 in reply to the Re-Invite message (T205).

When receiving the success response in reply to the Re-Invite message, the communication apparatus 200 transmits an ACK message to the communication apparatus 100 (T206). As a result, the first SIP session including the application media session and the image media session is updated to the second SIP session only including the application media session.

As with the first embodiment, this embodiment can be modified such that the SIP session includes media sessions other than the application media session and the image media session. It is also possible to determine the necessity/unnecessity of each media session based on a media session notified from and used by an application that transmits and receives media data. Further, an update message can be used as the SIP session update request.

Figure 7:
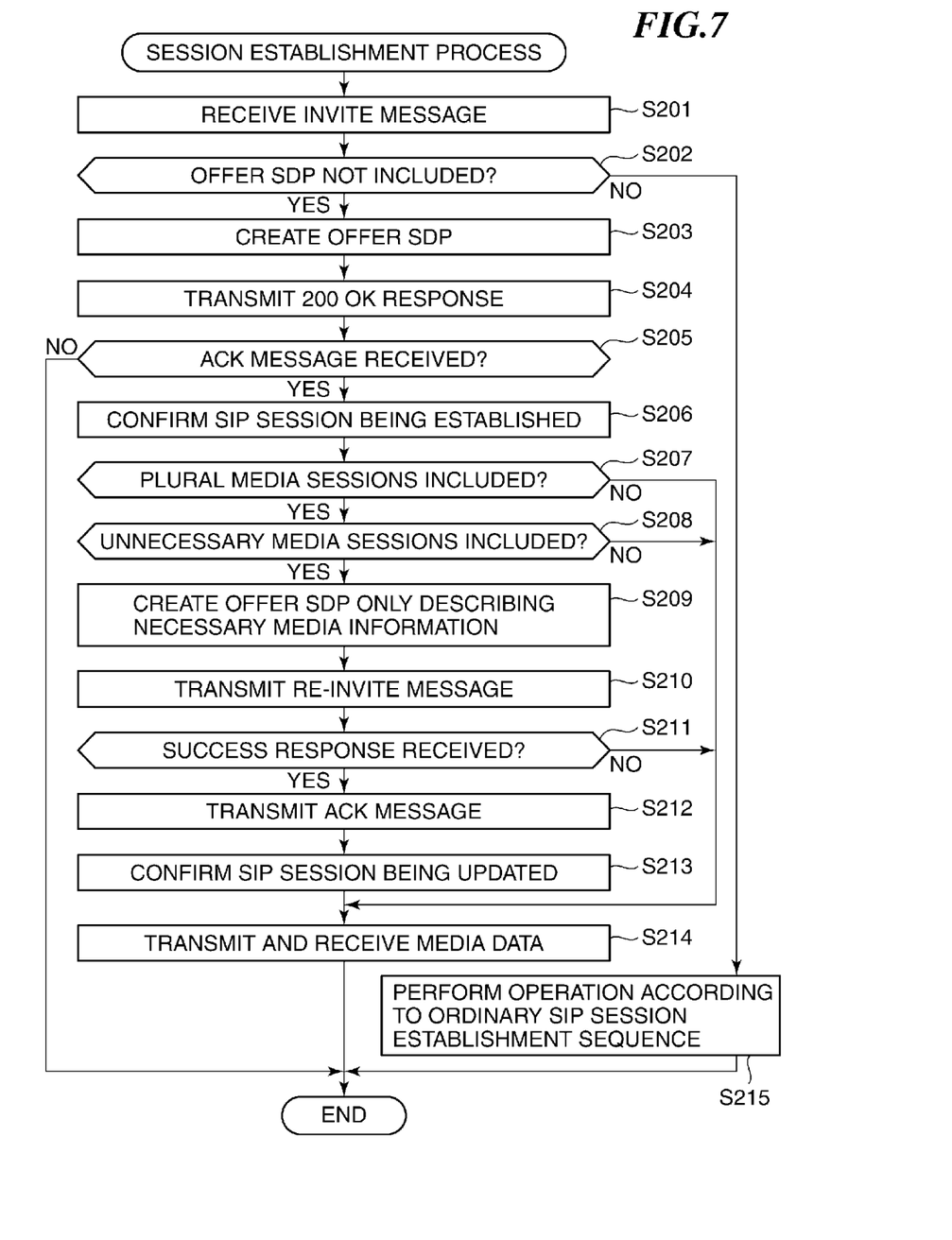
FIG. 7 is a flowchart showing procedures of a session establishment process performed by one of the communication apparatuses in the second embodiment.

FIG. 7 shows in flowchart the procedures of a session establishment process executed by the communication apparatus 200 in the second embodiment.

Referring to FIG. 7, the SIP reception unit 44 receives an INVITE message (step S201). Next, the SIP analysis unit 45 determines whether the received INVITE message does not include an offer SDP (step S202). If the INVITE message does not include an offer SDP (i.e., if the answer to step S202 is YES), the process proceeds to step S203. Otherwise, if the answer to step S202 is NO, the process proceeds to step S215.

The SDP creation unit 41 creates an offer SDP describing one or more media types that can be handled by the communication apparatus 200 (step S203). Next, the SIP message creation unit 42 creates a 200 OK response including the offer SDP, and the SIP transmission unit 43 transmits the 200 OK response (step S204).

Then, it is determined whether or not an ACK message is received within 32 seconds from when the 200 OK response is transmitted from the SIP transmission unit 43 (step S205). If the SIP transmission unit 43 receives the ACK message within 32 seconds (i.e., if the answer to step S205 is YES), the process proceeds to step S206. Otherwise, if the answer to step S205 is NO, the process is completed.

The communication apparatus 200 confirms that a SIP session is established (step S206). Next, the SIP analysis unit 45 determines whether the SIP session includes a plurality of media sessions (step S207). If the SIP session includes a plurality of media sessions (i.e., if the answer to step S207 is YES), the process proceeds to step S208. Otherwise, if the answer to step S207 is NO, the process proceeds to step S214.

The media determination unit 46 inquires of the TCP/IP communication unit 48 about open/close statuses of respective ports for use by the media sessions included in the SIP session, and determines whether the SIP session includes one or more media sessions that are unnecessary for actual communication (step S208). If the SIP session includes one or more unnecessary media sessions (i.e., if the answer to step S208 is YES), the process proceeds to step S209. Otherwise, if the answer to step S208 is NO, the process proceeds to step S214.

The SDP creation unit 41 creates an offer SDP only describing media information of the one or more media sessions determined in step S208 as being necessary (step S209). The SIP message creation unit 42 creates a Re-Invite message including the offer SDP created in S209, and the SIP transmission unit 43 transmits the Re-Invite message (step S210). The SIP reception unit 44 waits for a final response from the communication apparatus 100.

The SIP analysis unit 45 determines whether or not a received final response is a 200 OK response, which is a success response (step S211). If the final response is a 200 OK response (i.e., if the answer to step S211 is YES), the process proceeds to step S212. Otherwise, if the answer to step S211 is NO, the process proceeds to step S214. The SIP transmission unit 43 transmits an ACK message in reply to the 200 OK response (step S212). The communication apparatus 200 confirms that the SIP session established in step S206 is updated to a SIP session only including the one or more necessary media sessions (step S213). The media communication unit 47 transmits and receives media data by using one of the one or more media sessions included in the SIP session (step S214), whereupon the process is completed.

When determining in step S202 that the INVITE message includes an offer SDP, the communication apparatus 200 operates according to an ordinary SIP session establishment sequence described in, e.g., RFC 3261 (step S215), and if a SIP session is successfully established, transmits and receives media data.

Steps S201 to S206 in FIG. 7 correspond to a first session establishment unit that establishes a SIP session with another communication apparatus (communication apparatus 100). Step S208 corresponds to a determination unit that determines whether the SIP session established by the first session establishment unit includes an unnecessary media session. Steps S209 to S213 correspond to a second session establishment unit that establishes with the communication apparatus 100 a SIP session not including an unnecessary media session. Specifically, in steps S209 to S213, the communication apparatus 200 creates a SDP only including the necessary media session and transmits to the communication apparatus 100 a SIP connection update request based on the SDP, thereby establishing with the communication apparatus 100 a SIP session not including the unnecessary media session.

With the session establishment process of FIG. 7, in a case where it is determined that an initially established SIP session includes an unnecessary media session, the communication apparatus 200 establishes with the communication apparatus 100 another SIP session only including a necessary media session, whereby the SIP session from which the media session unnecessary for actual communication has been removed can be established.

Third Embodiment

Figure 8:
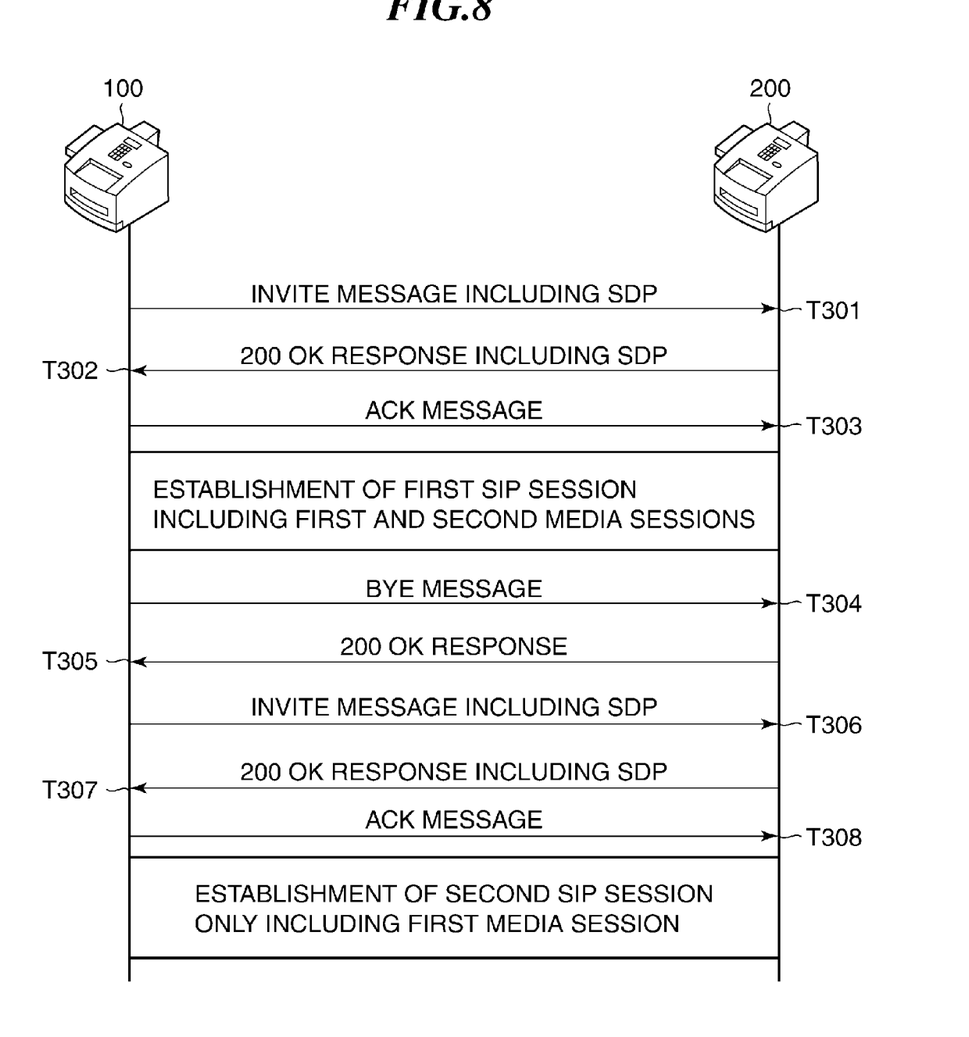
FIG. 8 is a sequence diagram showing information exchange between communication apparatuses in a third embodiment of this invention.

FIG. 8 shows, in sequence diagram, information exchange between the communication apparatuses 100, 200 in a third embodiment of this invention.

As with the communication apparatus 100 shown in FIG. 4, the communication apparatus 100 in FIG. 8 is capable of handling media of an application type and media of an image type and capable of establishing with the communication apparatus 200 a SIP session (including an application media session and an image media session) for data communication.

As with the communication apparatus 200 shown in FIG. 4, the communication apparatus 200 in FIG. 8 is capable of handling media of an application type and media of an image type and capable of establishing with the communication apparatus 100 a SIP session (including an application media session and an image media session) for data communication.

In a case where data communication using the SIP session can be achieved by means of the application media session and by means of the image media session, the communication apparatus 100 transmits to the communication apparatus 200 an INVITE message that includes a SDP in which application media information and image media information are described in hope that the communication apparatus 200 will select one of the application media session and the image media session (T301).

Since the communication apparatus 200 is capable of handling the two types of media proposed in the received INVITE message, the communication apparatus 200 does not select either the application media or the image media, but accepts both of them. The communication apparatus 200 then transmits to the communication apparatus 100 a success response (200 OK response) that includes a SDP describing the application media information and the image media information as media information indicating media that can be accepted for the SIP session (T302).

When receiving the success response, the communication apparatus 100 transmits an ACK message to the communication apparatus 200 (T303). As a result, a first SIP session is established that includes the application media session (serving as a first media session) and the image media session (serving as a second media session). At that time, the communication apparatus 100 confirms the open/close status of each of ports for use in the media sessions included in the SIP session. If one or more ports are open, it is determined that a corresponding one or more media sessions are necessary for SIP communication. If one or more ports are closed, it is determined that a corresponding one or more media sessions are unnecessary for SIP communication.

To disconnect the first SIP session, the communication apparatus 100 transmits to the communication apparatus 200 a Bye message as a SIP session disconnection request (T304).

The communication apparatus 200 transmits a success response to the communication apparatus 100 in reply to the Bye message (T305). The communication apparatus 200 receives the success response in reply to the Bye message to thereby confirm that the first SIP session is disconnected.

The communication apparatus 100 transmits to the communication apparatus 200 an INVITE message that includes an offer SDP only describing media information of a media session determined as being necessary among media sessions included in the SIP session (T306).

Since the communication apparatus 200 is capable of handling the media proposed in the received INVITE message, the communication apparatus 200 transmits to the communication apparatus 100 a success response (200 OK response) describing the media information indicating media to be accepted in the SIP session (T307).

When receiving the success response, the communication apparatus 100 transmits an ACK message to the communication apparatus 200 (T308), whereby a second SIP session only including the necessary media session is established.

As with the first embodiment, this embodiment can be modified such that the SIP session includes media sessions other than the application media session and the image media session. It is also possible to determine the necessity/unnecessity of each media session based on a media session notified from and used by an application that transmits and receives media data. Further, an update message can be used as the SIP session update request.

Figure 9:
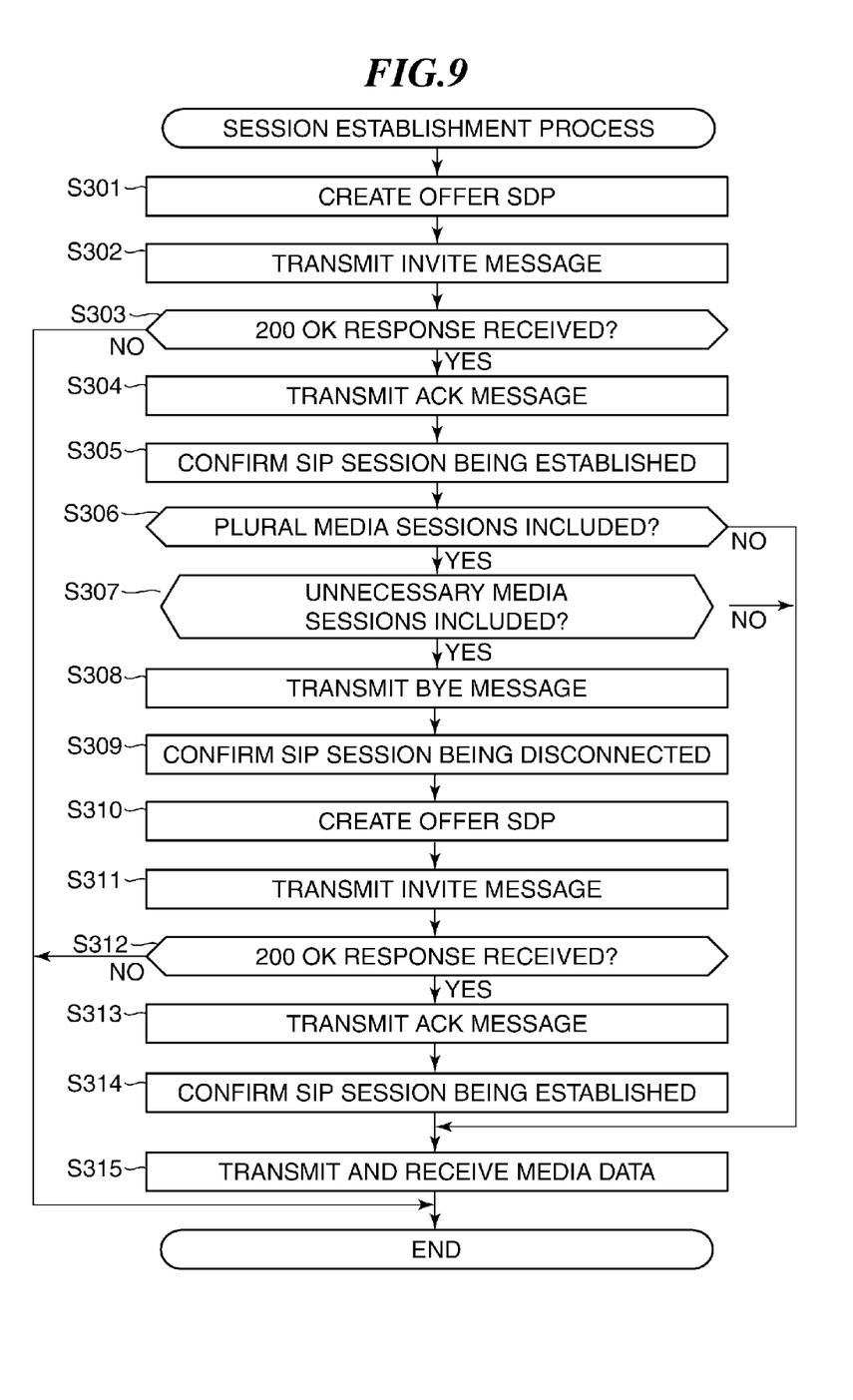
FIG. 9 is a flowchart showing procedures of a session establishment process performed by one of the communication apparatuses in the third embodiment.

FIG. 9 shows in flowchart the procedures of a session establishment process executed by the communication apparatus 100 in the third embodiment.

Referring to FIG. 9, the SDP creation unit 41 creates an offer SDP describing one or more media types that can be handled by the communication apparatus 100 (step S301). The SIP message creation unit 42 creates an INVITE message including the offer SDP, and the SIP transmission unit 43 transmits the INVITE message (step S302). The SIP reception unit 44 waits for a final response from the communication apparatus 200.

The SIP analysis unit 45 determines whether a received final response is a 200 OK response, which is a success response (step S303). If the final response is a 200 OK response (i.e., if the answer to step S303 is YES), the process proceeds to step S304. Otherwise, if the answer to step S303 is NO, the process is completed.

The SIP transmission unit 43 transmits an ACK message in reply to the 200 OK response (step S304). The communication apparatus 100 confirms that a SIP session is established (step S305). The SIP analysis unit 45 determines whether the SIP session includes a plurality of media sessions (step S306). If the SIP session includes a plurality of media sessions (i.e., if the answer to step S306 is YES), the process proceeds to step S307. Otherwise, if the answer to step S306 is NO, the process proceeds to step S315.

The media determination unit 46 inquires of the TCP/IP communication unit 48 about open/closed statuses of respective ports for use by the media sessions included in the SIP session, and determines whether the SIP session includes one or more media sessions that are unnecessary for actual communication (step S307).

If it is determined in step S307 that the SIP session includes one or more unnecessary media sessions (i.e., if the answer to step S307 is YES), the process proceeds to step S308. Otherwise, if the answer to step S307 is NO, the process proceeds to step S315.

The SIP message creation unit 42 creates a Bye message in reply to the SIP session, and the SIP transmission unit 43 transmits the Bye message (step S308). The SIP reception unit 44 receives a 200 OK response sent in reply to the Bye message, and the communication apparatus 100 confirms that the SIP session is disconnected (step S309).

The SIP message creation unit 42 creates an offer SDP only describing media information of one or more media sessions determined in step S307 as being necessary (step S310). Next, the SIP message creation unit 42 creates an Invite message including the offer SDP created in step S310, and the SIP transmission unit 43 transmits the Invite message (step S311). The SIP reception unit 44 waits for a final response from the communication apparatus 200.

The SIP analysis unit 45 determines whether a received final response is a 200 OK response, which is a success response (step S312). If the final response is a 200 OK response (i.e., if the answer to step S312 is YES), the process proceeds to step S313. Otherwise, if the answer to step S312 is NO, the process is completed.

The SIP transmission unit 43 transmits an ACK message in reply to the 200 OK response (step S313). The communication apparatus 100 confirms that the SIP session only including the one or more necessary media sessions is established (step S314). The media communication unit 47 transmits and receives media data by using one of the one or more media sessions included in the SIP session (step S315), whereupon the process is completed.

Steps S301 to S305 in FIG. 9 correspond to a first session establishment unit that establishes a SIP session with another communication apparatus (communication apparatus 200). Step S307 corresponds to a determination unit that determines whether the SIP session established by the first session establishment unit includes an unnecessary media session. Steps S308 to S314 correspond to a second session establishment unit that establishes with the communication apparatus 200 a SIP session not including an unnecessary media session. Specifically, in steps S308 to S314, the communication apparatus 100 disconnects the SIP session established by the first session establishment unit, creates a SDP only including the necessary media session, and transmits to the communication apparatus 200 a SIP connection establishment request based on the SDP, thereby establishing with the communication apparatus 200 a SIP session only including the necessary media session.

With the session establishment process of FIG. 9, in a case where it is determined that an initially established SIP session includes an unnecessary media session, the communication apparatus 100 establishes with the communication apparatus 200 another SIP session only including a necessary media session, whereby the SIP session from which the media session unnecessary for actual communication has been removed can be established.

In this embodiment, since the SIP session only including the necessary media session is established, it is possible to more effectively utilize resources (such as a port, socket, and memory) of the communication apparatus, as compared with a case where a SIP session including an unnecessary media session is established.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-189759, filed Aug. 26, 2010, which is hereby incorporated by reference herein in its entirety.

What is claimed is:

1. A communication apparatus comprising:
a memory; and
a processor in communication with the memory, the processor configured to:
transmit information, describing one or more media types, to a second communication apparatus;
perform a data communication using a SIP session established with the second communication apparatus based on the transmitted information;
determine, when said information describing a plurality of media types is transmitted, the number of SIP sessions established with the second communication apparatus; and
transmit, when the number of the established media sessions is greater than one, information describing one media type out of the plurality of media types without describing the other media types, and perform, when the number of the established media sessions is one, the data communication using the established media session.

2. The communication apparatus according to claim 1, wherein the media type is described based on Session Description Protocol (SDP).

3. The communication apparatus according to claim 1, wherein the plurality of media types include media of an application type and media of an image type.

4. The communication apparatus according to claim 3, wherein said processor is further configured to transmit, when the number of the established media sessions is greater than one, a RE-INVITE message together with information describing media of the application type without describing the media of the image type.

5. The communication apparatus according to claim 1, wherein said processor is further configured to transmit an INVITE message, depending on Session Initiation Protocol (SIP), together with the information.

6. The communication apparatus according to claim 5, wherein said processor is further configured to transmit, when the number of the established media sessions is greater than one, a RE-INVITE message together with information describing one media type out of the plurality of media types without describing the other media types.

7. The communication apparatus according to claim 5, wherein said processor is further configured to disconnect, when the number of the established media sessions is greater than one, a secession of Session Initiation Protocol (SIP) established with the second communication apparatus, before transmitting an INVITE message together with information describing one media type out of the plurality of media types without describing the other media types.

8. The communication apparatus according to claim 5, wherein said processor is further configured to transmit the information in response to the INVITE message depending on the Session Initiation Protocol (SIP).

9. The communication apparatus according to claim 8, wherein said processor is further configured to transmit the information in response to the INVITE message, when the INVITE message does not include information describing the one or more media types.

10. The communication apparatus according to claim 9, wherein said processor is further configured to transmit, when the number of the established media sessions is greater than one, the RE-INVITE message together with information describing one media type out of the plurality of media types without describing the other media types.

11. A control method of a communication apparatus, comprising:
a transmission step of transmitting information, describing one or more media types, to a second communication apparatus;
a data communication step of performing a data communication using a media session established with the second communication apparatus based on the information transmitted at said transmission step;
a determination step of determining, when said transmission step transmits information describing a plurality of media types, the number of media sessions established with the second communication apparatus; and
a control step of controlling said transmission step to transmit, when the number of the established media sessions is greater than one, information describing one media type out of the plurality of media types without describing the other media types, and control said data communication unit to perform, when the number of the established media sessions is one, the data communication using the established media session.

12. A non-transitory computer readable storage medium storing a program for causing a computer to execute a control method of a communication apparatus, the control method comprising:
a transmission step of transmitting information, describing one or more media types, to a second communication apparatus;
a data communication step of performing a data communication using a media session established with the second communication apparatus based on the information transmitted at said transmission step;
a determination step of determining, when said transmission step transmits information describing a plurality of media types, the number of media sessions established with the second communication apparatus; and
a control step of controlling said transmission step to transmit, when the number of the established media sessions is greater than one, information describing one media type out of the plurality of media types without describing the other media types, and control said data communication unit to perform, when the number of the established media sessions is one, the data communication using the established media session.

* * * * *